United States Patent [19]

Huff

[11] 4,221,882

[45] Sep. 9, 1980

[54] HIGH IMPACT MELT-FLOWABLE DUAL CONTINUUM MELT MIXED POLYMER BLENDS OF POLYPROPYLENE, POLYETHYLENE, AND ETHYLENE-PROPYLENE RUBBER

[75] Inventor: Terrence Huff, Baytown, Tex.

[73] Assignee: Exxon Research & Engineering Co., Florham Park, N.J.

[21] Appl. No.: 7,861

[22] Filed: Jan. 31, 1979

[51] Int. Cl.² .................... C08L 23/12; C08L 23/06; C08L 23/16

[52] U.S. Cl. .................................... 525/240; 525/197

[58] Field of Search .................... 260/897 A; 525/240

[56] References Cited

U.S. PATENT DOCUMENTS

| | | |
|---|---|---|
| 3,137,672 | 6/1964 | Lehane ................................... 260/41 |
| 3,256,366 | 6/1966 | Corbelli ................................. 260/897 |
| 3,256,367 | 6/1966 | Jayne .................................... 260/897 |
| 3,957,919 | 5/1976 | Von Bodugen et al. ........ 260/897 A |
| 4,087,485 | 5/1978 | Huff ................................. 260/897 A |
| 4,088,714 | 5/1978 | Huff ................................. 260/897 A |

*Primary Examiner*—Carman J. Seccuro
*Attorney, Agent, or Firm*—B. C. Cadenhead; M. B. Kurtzman

[57] ABSTRACT

Melt mixed, melt-flowable blends of polypropylene, at least about 30% polyethylene and from about 4 to about 11% ethylene-propylene copolymer rubber, and method for making same, are disclosed. Such blends possess higher low temperature Izod and Gardner impact strength than conventional impact polypropylene blends, while having a comparable or higher flexural modulus.

14 Claims, No Drawings

HIGH IMPACT MELT-FLOWABLE DUAL CONTINUUM MELT MIXED POLYMER BLENDS OF POLYPROPYLENE, POLYETHYLENE, AND ETHYLENE-PROPYLENE RUBBER

BACKGROUND OF THE INVENTION

This invention relates to a melt-flowable high-impact melt mixed blend of polypropylene and polyethylene, preferably high density polyethylene, believed to have an interpenetrating network structure which is stabilized against collapse during molding by inclusion of minor but effective amounts of an ethylene-propylene copolymer elastomer.

Ternary blends of low density polyethylene (LDPE), polypropylene (PP) and monoolefin polymer rubbers having improved impact strengths and optical clarity have been disclosed previously in U.S. Pat. Nos. 4,088,714 and 4,087,485, respectively. U.S. Pat. No. 4,088,714 discloses that the impact properties of polypropylene (PP) and cross linkable low density polyethylene (LDPE) blends could be significantly improved by addition of an ethylene-propylene copolymer elastomer (EPR) to the blend, in an amount such that the ratio of elastomer to the cross linkable low density polyethylene (LDPE) was approximately one to one, and curing the elastomer with the cross linkable LDPE to form a discontinuous, tightly cross linked phase of elastomer and LDPE which is intimately dispersed in a continuous phase of PP. Although a tightly cross linked phase of EPR and LDPE is not itself melt flowable, it was found that by being intimately dispersed in a continuous phase of PP which was melt flowable, the total blend assumed a benificial melt flowable characteristic. In U.S. Pat. No. 4,087,485 it was disclosed that an impact polypropylene blend having surprisingly good optical properties may be formulated by partially curing an EPR with a cross linkable LDPE in the presence of polypropylene, wherein the polypropylene component comprises about 70 to 95 percent of the total mixture.

Although such blends of PP and LDPE had an excellent balance of overall mechanical properties as compared to previous PP/LDPE blends, this improvement depended upon the achievement of crosslinking of the EPR with the LDPE. Additionally, the employment of a LDPE does not permit the achievement of as high a tensile strength, flexural modulus or impact strength in the final blend as could be achieved if a high density polyethylene (HDPE) could be used.

Certain binary blends of HDPE and PP have been previously formulated which have a good balance of low temperature impact strength (Izod) and flexural modulus. Such blends, which exhibit these good mechanical properties when the relative concentrations of PP to HDPE is about 1:1 to 2:1, have proved unsatisfactory for molding large finished parts wherein the molding process employs high temperatures and pressures, e.g. in injection molding. Parts molded from such binary blends of PP/HDPE have failed due to delamination of the two phases. Additionally, although binary blends of PP and HDPE have good Izod impact and flexural modulus properties, it has been found that their Gardner impact strengths are exceptionally poor.

Studies of the morphology of melt mixed binary blends of PP and HDPE, wherein the relative ratio of PP/HDPE is about 1:1 to about 2:1, indicate that upon melt mixing an interconnected three dimensional continuum network of HDPE interlocked with an interconnected three dimensional continuum network of PP, a dual continuum structure, may be formed. This interpenetrating interlocked network structure is believed to account for the good Izod impact-flexural properties observed in parts molded from such blends, but is relatively unstable under shear in the melt state thereby providing for a good melt rheology.

The delamination observed in finished parts which have been molded from such PP/HDPE binary blends is believed to stem from a disruption of this dual continuum network structure which occurs in the molding process. Heat and pressure encountered in the molding process causes the interlocking dual continuum network structure to collapse. Upon collapse the blend structure is believed to assume a machine oriented fibrous tape-like dispersion wherein a multiplicity of tape-like structure of HDPE and PP become interlayered, one upon the other, within the molded part. Molding processes convert the internal structure of melt mixed blend from that of a interlocked dual continuum to that of machine oriented separate layers along which, due to the poor interfacial bonding which exist between HDPE and PP, surface delamination may occur in finished molded parts, presumably occuring along the HDPE/PP interface.

Previous workers have included monoolefin polymer rubbers, e.g. ethylene-propylene copolymer elastomers (EPR) and the like in certain binary blends of HDPE and PP to improve the mechanical properties of such blends. Blends of monoolefin polymer rubbers, e.g., ethylene-propylene copolymer elastomers and ethylene, propylene and copolymerizable polyene terpolymer elastomers, with polyolefins, e.g., high density polyethylene, polypropylene and the like, which can be processed and fabricated by methods used for thermoplastics and have elastomeric properties without requiring vulcanization are well-known. Furthermore, thermoplastic elastomer blends of partially cured monoolefin copolymer rubbers and certain polyolefins are known. See, for example, U.S. Pat. Nos. 3,758,642 and 3,806,588. It is disclosed in both of these prior art patents that the partial curing of the monoolefin copolymer rubber is essential to produce a blend which has the characteristics of a thermoplastic resin, i.e., which can be reprocessed, while also having elastomeric characteristics.

Known thermoplastic elastomer blends of monoolefin polymer rubbers and polyolefin resins suffer from a disadvantage of having less than desirable overall balance of mechanical and physical properties, such as low resiliency, tensile strength, stiffness, surface hardness, and/or high heat distortion, permanent or tension set, etc. Furthermore, many known blends, including blends prepared in accordance with the teachings of the above-mentioned U.S. Pat. Nos. 3,758,643 and 3,806,558 or U.S. Pat. No. 3,835,201, have less than desirable melt rheologies, e.g., high viscosity at high shear rates and the high melt temperatures normally used in injection molding. Such undesirable characteristics restrict the use of such known thermoplastic elastomer blends in the manufacture of many types of flexible molded or extruded articles. This is particularly evident in the manufacture of flexible body components for the automotive industry. For such a use, a thermoplastic elastomer is required which has such characteristics as relatively low viscosity at high shear rates at melt temperatures for use in high-speed injection molding or extrusion techniques to provide flexible body components having high resiliency, tensile strength, flexural modulus, etc. along with low permanent set, heat distortion and the like.

The addition of EPR to certain PP/HDPE blends has also been proposed to overcome certain processing problems. U.S. Pat. No. 3,256,366 teaches a method whereby a vulcanizing agent, such as a peroxide may be intimately mixed with a high or low density PE, without encountering the prevulcanization problems inherent in such mixing, by premixing the PE with between 10% to 70% by weight, of a rubbery copolymer such as EPR which acts as a diluent. U.S. Pat. No. 3,256,366 additionally discloses that up to 30% of PP may be mixed with the PE/EPR blend to improve the mechanical properties of a finished vulcanized article formed therefrom.

A recent effort to develop a low EPR content PP and PE blend with improved impact resistance is dislosed in German Offenlegungsschriften No. 2,801,217 to Mitsui. Mitsui comprises a three step polymerization process wherein isotactic PP is prepare is the first step. In a second step ethylene-propylene is polymerized in the presence of the PP of step one, forming a PP-EPR block copolymer. Finally, PE is prepared in a third step, in the presence of the PP-EPR of step two, to produce a finished high impact block copolymer blend comprising about 35.2 mol.% PE, 4.85 mol.% amorphous polymer (EPR) and the remainder (59.95 mol.%) PP. From Mitsui it appears that block copolymerization is required to produce a high impact formulation with a good balance of other mechanical properties.

U.S. Pat. No. 3,256,367 discloses that the impact strengths, stiffness and heat resistance properties of PP/EPR blends may be improved by the addition of a HDPE component in a PP:HDPE ratio of from about 2:1 to about 48:1 and preferably 3.25:1 to 23:1. The combined amount of EPR and HDPE is preferably maintained at less than 35% by weight in order to produce a mixture of desirable flexural characteristics. The ratio of EPR/HDPE is generally one or greater. At a EPR/HDPE ratios of about 1.0 or greater, the flexural modulus of such mixtures falls off rapidly as the concentration of combined EPR and HDPE increases, especially as it exceeds 33%. Yet, when an EPR/HDPE ratio of less than one is employed the 0° C. Izod impact strength is significantly worse. The rapid loss in low temperature impact strengths which occur at EPR/HDPE ratios less than one requires, in order to maintain good low temperature impact properties, the employment of the more expensive EPR in order to keep the EPR/HDPE ratio greater than one.

It is desirable in impact polypropylene formulations to achieve a high level of low temperature impact strength while maintaining a high room temperature flexural modulus. Such combination of properties are exhibited by melt mixed blends of PP and HDPE wherein the respective ratio of such components is from about 1:1 to about 2:1. However, such blends alone cannot be used to produce satisfactory molded parts because of the occurence of delamination in such parts and because falling weight, low temperature impact strength is unacceptably poor.

SUMMARY OF THE INVENTION

It has now been found that a melt-flowable blend of PP and HDPE presumed to possess a dual continuum structure may be stablilized against loss of this structure and delamination in parts molded from such blend by inclusion of a minor, but effective, amount of an EPR copolymer in the blend prior to melt fabrication. The addition of such amounts of EPR also produces significantly improved low temperature Gardner impact strengths.

The EPR acts to stablize the dual continuum structure of such blends against collapse when subjected to the heat and pressure of molding processes. It is believed that the EPR incorporates itself, during melt mixing, between the PP/HDPE interfaces of the dual continuum structure and functions as a molecular glue to improve interfacial bonding.

Incorporation of such amounts of EPR into blends of PP/HDPE wherein the PP:HDPE ratio is 1:1 or greater prior to melt fabrication allows such material to be used to make molded parts which have impacts strengths equal to or higher than parts molded from conventional impact polypropylene formulations (i.e., PP-EPR-HDPE at EPR/HDPE$\geq$1.0.) Parts molded from blends of this invention have equal or higher heat distortion properties and have also been found to be resistant to stress whitening upon impact loading as compared to conventional impact grades of polypropylene.

In applications, such as films, packaging materials and the like, requiring heat-sealable blends having good clarity the HDPE component may be replaced with a LDPE. Blends of LDPE and PP also form a dual continuum structure upon melt mixing which may be stabilized by inclusion of minor but effective amounts of EPR. As compared to conventional PP/LDPE blends, blends stabilized in accordance with this invention also exhibit a good balance of flexural modulus and impact strengths, although these properties, in molded test pieces, are not as great as those exhibited by blends of this invention which employ a HDPE component.

DETAILED DESCRIPTION OF THE INVENTION

In the practice of this invention, the impact PP/HDPE blends of the invention employ a ratio, by weight, of PP to the combined amount of PE and EPR of from about 1 to about 2. The polyethylene component should have a density of about at least about 0.919 g/cc. The ethylene-propylene copolymer rubber included in the blend is contained in an amount which by weight percent of the total mixture ranges from about 3.5 to 11 percent. The EPR should have an ethylene content which is equal to or exceeds 30 percent. On a weight percent basis of the final blend, blends within the scope of this invention comprise about 45–67 percent polypropylene, about 30–45 percent polyethylene and 3.5–11 percent of ethylene-propylene copolymer.

In order to achieve the good balance of low temperature impact strength and room temperature flexural modulus, it is believed necessary to employ a ratio of polypropylene to polyethylene which will produce an interlocked dual continuum network structure in the blend upon melt mixing. Since a high density polyethylene is preferred in most applications, hereafter the polyethylene component will be generally referred to as HDPE. The preferred minimum ratio of PP to the combined amount of HDPE and EPR for this purpose is about 1, and the highest ratio which has been found to be satisfactory is about 2.0. The necessary ratio has been found to depend, at least in part, upon the melt flow rate (MFR) of the PP which is used. Where the PP has a melt flow rate of one or less (a fractional MFR polypropylene) it has been found that at least 30 percent by weight HDPE based upon the entire blend should be employed and at least about 4 percent by weight EPR, based upon the entire blends should be used to stabilize the dual continuum structure. In this case the ratio of PP to the combined HDPE and EPR may range from about 1.0 to about 2.0. When the PP component has a melt flow rate greater than about 1 it has been found that at least about 37 percent by weight HDPE based upon the entire blend should be employed and at least about 5.5 percent by weight EPR based upon the entire blend should be used. Thus where the PP has a melt flow rate greater than 1 the ratio of PP to the combined HDPE and EPR may range from about 1.0 to about 1.55.

Additionally, since it is desirable to minimize the amount of EPR required—the most expensive component of the blend—the melt flow rate of the PP and the melt index (MI) of the HDPE should be comparable. To be comparable the MI of the polyethylene component should be around one half of the numerical valve of the MFR of the PP component. Generally, the minimum amounts discussed above apply only when the HDPE melt index rate is comparable to the melt flow rate of the PP component. As the difference in the melt index of the HDPE and the PP components becomes greater it becomes necessary to employ higher concentrations of HDPE and EPR in the blend in order to maintain a given level of mechanical properties.

The polypropylene useful in the blends of this invention are normally solid isotactic polypropylenes, i.e., polypropylenes of greater than 90 percent hot heptane insolubles, having a melt flow rate (MFR) of from about 0.3 to about 35 g/10 minutes (230° C., 2160 g load). The particular density of the polypropylene is not critical. As known, such isotactic polypropylenes are normally crystalline and have density ranges from about 0.89 to about 0.91 g/cc. Perferably, a polypropylene having a melt flow rate of about 0.3 to about 12.0 is employed. Within this range the MFR is selected in dependance upon the processing steps for which the blend is designed. For example, where the blend is designed for injection molding, the PP should have a MFR greater than 3; if designed for sheet extruding, thermoforming or stamping the MFR should be less than 1. Moreover, the blends of the invention can include more than one polypropylene component, i.e., several polypropylenes having different melt flow rates, whereby the resulting blends have melt flow rates within the above ranges.

The polyethylenes which are useful in this invention are those normally solid polymers having a density greater than 0.919 g/cc and a melt index (MI) of from about 0.1 to about 20 g/10 minutes, (190° C. at 2160 g load). Except for blends that are designed for special applications which require good heat sealability and clarity properties and therefore require the use of a LDPE component, it is preferred to employ a HDPE in order to produce blends having a high flexural modulus and impact strength. Thus, the preferred polyethylenes have densities greater than about 0.950 g/cc and may have a MI between 0.1 to about 100. Since the impact strength of the blend will vary inversely with the melt index of the HDPE, the MI will usually be from about 0.1 to about 20. Since the best balance between flexural modulus and impact strength occurs when the MI of the HDPE is from about 0.1 and about 5.0, this range is preferred. The most preferred range is from about 0.3 to about 3.0. Such polyethylenes and methods for making same are well known and are readily available commercially.

The ethylene-propylene copolomer rubber employed in the blend of this invention is an ethylene-propylene elastomer which has a Mooney viscosity greater than 20 (ML(1+8)at 212° F.), and, generally, between the range of 20 to about 120 and preferably from about 35 to 60. The percentage of ethylene in such rubber should be greater than 30 percent by weight and, preferably, about 40 to 60 weight percent, although the particular amount has not been found to be particularly crucial to the invention. Generally, EPR's having a narrow molecular weight distribution will produce blends having better flexural moduli than EPR's having broad molecular weight distributions. Such EPR copolymers and methods for making same are well known and are readily available commercially from a number of manufacturers. Therefore, such rubbers will not be discussed in detail, except to point out that any EPR copolymer having the above identified characteristics may be employed in this invention.

In the practice of this invention, a ratio of PP to the combined amount of HDPE and EPR of from about 1 to about 2.0 has been found suitable to produce significantly improved low temperature impact strength while maintaining a good high temperature flexural modulus. The amount of EPR which should be incorporated within the blend to stabilize the dual continuum melt mix structure depends upon the particular combination of properties desired in the final mix. Increasing the EPR amount increases the low temperature impact strength at the expense of some loss in flexural modulus and, conversely, decreasing the amount of EPR increases flexural modulus at the expense of low temperature impact strength. Although the inclusion of any amount of EPR which ranges between about 4.0 to about 11 percent by weight of the total mixture tends to stabilize the dual continuum structure against collapse when submitted to the molding process, the rubber component is the more expensive component of the blend, therefore it is preferred to use an EPR concentration which ranges from about 4.0 to about 8 percent as giving the best trade off between cost versus improved mechanical properties.

Other components such as colorants, stabilizers, antioxidants, fillers and the like may be included within the composition of these blends without adversely affecting the mechanical properties. Dual continuum blends made in accordance with this invention have been stabilized with disteary1 thiodipropionate (DSTDP) as an antioxidant and IR 1010 and/or DSTDP as a thermal or processing stabilizer to prevent molecular weight degredation during processing with no adverse effect upon the mechanical properties. Carbon black has been added to such blends without serious adverse effect. Specific examples of stabilizers have been mentioned as an illustration that other combinations of conventional additives could be used.

Generally, to produce the melt mixed dual continuum blends of this invention it is necessary to mix the EPR with at least one of the two other components, PP or PE, by a high shear mixing method. This premixture may then be mixed with the remaining component by a low shear mixing method. Although the order of mixing is not critical, it is preferred to mix the EPR component with the PP by a high shear mixing method, with the HDPE component, as virgin stock or as a mixture with PP, melt mixed by low shear mixing.

In a preferred blending method a total preblend batch of PP and EPR are premixed in a Banbury mixer, Farrel Continuous mixer or a Twin Screw Extruder. The mixing temperature is normally about 204° C. (400° F.), and mixing is continued until the EPR is well dispersed in the PP phase. This total preblend batch is then pelletized or powdered and mixed with an appropriate amount of virgin HDPE, and melt mixed as an extruder letdown, normally at about 204° C. (400° F.). Alternatively, a masterbatch of EPR and PP may be prepared by blending EPR with a first portion of PP and the melt mix blend prepared as an extruder letdown of this masterbatch with a mixture of a second portion of PP and HDPE. No significant differences in the mechanical properties of the final blend has been observed when the EPR is premixed with the total amount of PP as compared to when the EPR is premixed with a first portion of PP and the masterbatch is subsequently melt mixed with the final portion of PP and HDPE.

In the total preblend method, for example, a mixture of 80 percent by weight polypropylene is mixed with 20 percent by weight of an ethylene-propylene copolymer and is blended in a Banbury for about 4 minutes at 204° C. (400° F.). After blending, the preblend is dumped, sheeted, cooled and chopped to pellet size. Subsequently 55 percent by weight of the preblend PP/EPR is added to 45 percent by weight of a high density polyethylene to make up a pellet mixture which is suitable for melt mixing in an extruder letdown at about 204° C. (400° F.) with a 100 mesh screen pack in place. The final melt mixed blend, comprising 44 percent PP, 45 percent HDPE and 11 percent EPR is then ready to be used for molding parts.

The PP, HDPE and EPR blends may be processed into molded parts in their virgin state, as a regrind or as a mixture of virgin and regrind stock.

The following tables more particularly illustrate the nature of the invention and the composition of the blends and are not intended to be limitations thereon. In the following examples, the mechanical property evaluations were made employing the following tests:

| TEST FOR | VIA | ASTM |
| --- | --- | --- |
| Melt Processability | Melt Flow Rate | D 1238L |
| Stiffness | Flexural Modulus | D 790 I.A. |
| Strength Properties | Tensile & Elongation at yield and fail | D 638 Speed C |
| Impact Strength | Room Temperature Notched Izod | D 256 |
| | Unnotched Izod at 1, −20, −40° F. | D 256 |
| | Gardner at 0° F. | Falling dart test[a] |

[a]Gardner impact tester used; data reduction by the Bruceton staircase design.

Test specimens for the above mechanical property evaluations were produced on an HPM injection molding machine, 350 tons capacity, Egan 2" Reciproscrew feed.

EXAMPLE 1

A total preblend of 1634 g polypropylene (E-115, Exxon Chemical Co., 5 MFR homopolymer) and 409 g. of an ethylene-propylene copolymer rubber (Exxon Chemical Co., 40 wt.% ethylene content) were mixed in a Banbury mixer for 4 minutes at 400° F. After mixing the Banbury pig was chopped to pellet size. A pellet blend comprising 8.25 lbs. of the PP/EPR preblend and 6.75 lbs. of a polyethylene components (MI=0.3, density=0.960) was prepared and melt mixed as an extruder letdown at about 400° F. as the set temperature in all extruder zones, with a 100 mesh screen pack. The dual continuum blend so produced comprised 11% EPR, 45% PE and 44% PP, by weight.

EXAMPLE 2

A masterbatch of PP/EPR of 2.7 lbs. polypropylene (E-115) and 1.8 lbs. EPR (MD 714A, 50 wt.% ethylene content) were mixed in a Banbury mixer for 4 minutes at 400° F. The Banbury pig was pelletized. A pellet blend of 2.1 lbs. of the PP/EPR masterbatch, 4.7 lbs. PE (MI=0.3, density=0.960) and 5.9 lbs. PP (E-115) was melt mixed as an extruder letdown at about 400° F. with 100 mesh screens. The dual continuum blend produced comprised, 6.6% EPR, 37.0% PE and 56.4% PP, by weight.

Table I reports the properties of the melt mixed blends of Examples 1 and 2 and compares them with the properties of conventional impact PP/PE blends containing EPR. Additionally, the properties of binary melt mixed blends of PP/PE are reported for comparison. Unless indicated to the contrary, the compositions reported in Table I were formulated with the following components:

EPR—(V404), 40 Mooney viscosity (1+8(a) 212° F.), ethylene content 40 wt.%;

PE—(A60003) Allied Chemical Co., MI=0.3, density=0.960; and

PP—(E-115) Exxon Chemical Co., MFR=5.0, homopolymer.

Table I illustrates the significant improvement in the impact properties of PP formulations made in accordance with this invention. The formulations of Example 1 and 2 exhibit greatly increased Gardner impact strengths compared to conventional blends A, B, and C. The increase in impact strengths achievable by the addition of minor amounts of EPR is clearly evident upon comparison to the binary blends which contains no EPR. In comparison to the conventional blends, Examples 1 and 2 have a comparable flexural modulus. The effect of maintaining the PP/HDPE+EPR ratio within the preferred range of 1-2 is illustrated by comparison of Examples 1 and 2, Example 1 having a ratio below one has a flexural modulus significantly less than Example 2.

The examples set forth in the following tables were formulated in accordance with the masterbatch method.

Tables II, III and IV illustrate the relationship between the MFR of the PP component and the minimum amounts of EPR and HDPE, by weight of the total blend, necessary to the formulation of blends having improved impact strengths and good flexural modulus.

Table II illustrates blends formulated with a PP component having a melt flow rate greater than one. When a MFR ≳ 1 PP is employed the minimum total amount of EPR+HDPE should be about 40% by weight or greater. Thus, in examples 3-7, a dramatic increase in the impact properties occurs between samples 5 and 6. The minimum amount of EPR needed, when HDPE is held at 37%, is shown by samples 8-11 to fall between 4 and 6% as evidenced by the dramatic increase exhibited in the Gardner impact strengths between these limits, with the preferred minimum falling at about 5.5%.

Table III illustrates that when a fractional MFR grade PP is employed, as when a thermoforming blend is desired, that to achieve improved impact properties the minimum total concentration of EPR+HDPE must be about 30% or greater, as evidenced by the increased Gardner impact strength between samples 13 and 14.

Table IV illustrates the more precise limits for obtaining a desirable property balance in dual continuum blends containing a fractional MFR grade PP as having a minimum total concentration of EPR+HDPE of 34% or greater, wherein the minimum amount of HDPE is 30% and the minimum amount of EPR is 3.5%.

Table V illustrates the rapid fall off of flexural modulus that occurs in conventional impact blends which employ EPR and HDPE in a ratio of 1 or greater when the total concentration of EPR+HDPE begins to exceed about 33% of the total blend.

When samples 24-29 of Table V are contrasted to the dual continuum blends of this invention, samples 6, 7, 10, 11, 14, 15, 16, 17 and 18, it is apparent that it is not possible to obtain a comparable balance of good flexural modulus and low temperature impact strength with a convention blend as can be achieved by the dual continuum blends of the present invention.

In conventional blends where EPR and HDPE, at a EPR/HDPE ratio of one or greater, are employed to improve impact strength the flexural modulus falls off rapidly as the EPR+HDPE exceeds 33%. On the other hand, as illustrated by Table VI where the combined total of EPR+HDPE is kept below about 34% any attempt to decrease the amount of the more expensive EPR component that decreases the EPR/HDPE below 1.0 causes a rapid fall off in the low temperature impact strength of the blend.

Applicant has surprisingly found that a good balance between flexural modulus and low temperature impact strength may be achieved at EPR/HDPE ratios less than 1 and EPR+HDPE total concentrations greater than about 34%.

No surface delamination has been observed to occur in large parts molded from the blends of the present invention.

EXAMPLE 36

A dual continuum blend was prepared with a low density polyethylene, in replacement of HDPE, according to the masterbatch procedure set forth in Example 2. The EPR was V-404, PP was E-115, and the LDPE was LD 102 having an MI of 6.5 and a density of 0.922 g/cc. The composition comprised 5.6% EPR, 37.0% LDPE and 57.4% PP by weight. Test specimens were prepared by injection molding and by film extruding. The injection molded specimen had the following properties:

| | |
|---|---|
| MFR | 7.8 |
| Flexural Modulus (psi $\times 10^{-3}$) | 104 |
| Tensile, yield (psi) | 2949 |
| % Elongation, yield | 19.4 |
| R.T. Notched Izod (ft-lbs/inch) | 4.0 |
| Unnotched Izod at 0° F. | 37.5 |
| Gardner Impact at 0° F. (96 mil disk), inch-lbs. | 31 |
| Pentane Extractables | 6.8 |

The film extruded specimen had the following properties as compared to films produced from an Amoco 6011 random copolymer; polypropylene (E-115); and a dual continuum blend prepared with a HDPE component comprising 37% HDPE, 5.5% EPR and 57.5% PP (film impact strength conducted according to ASTM D 1709-62T):

| Properties | Amoco 6011 | E-115 | HDPE Dual Continuum | Example 36 |
|---|---|---|---|---|
| Impact at RT (Kg-Cm) (3 mil film) | 26 | 9 | 6 | 39 |
| Impact at 0° F. (Kg-Cm) (3 mil film) | 5 | 2 | 4 | 10 |

As can be seen from the above data, a dual continuum blend formulated with LDPE has significantly improved impact properties when extruded into a film, compared to convention film making formulations, but relatively poor low temperature Gardner impact strengths when used in injection molding. Conversely, a dual continuum blend formulated with HDPE has poor film impact strengths but, as has been illustrated by previous examples, significantly improved impact strength when used to make injection molded parts.

Although the invention has been described in terms of its preferred embodiments those of ordinary skills may make changes and modifications thereto without departing from the scope and spirit of the invention as disclosed and claimed as follows.

TABLE I

| | Example 1 | Example 2 | Binary Blends | | Conventional Blends | | |
|---|---|---|---|---|---|---|---|
| | | | | | A | B | C |
| EPR, wt.% | 11.0 | 6.6 | 0 | 0 | 17.8 | 10.0 | 6.7 |
| Polyethylene, wt.% | 45.0 | 37.0[1] | 40.0 | 40 | 15.6 | 8.75 | 5.8 |
| Polypropylene, wt.% | 44.0 | 56.4 | 60[2] | 60 | 66.6 | 81.25 | 87.5 |
| Ratio: PP/HDPE + EPR | 0.79 | 1.29 | 1.50 | 1.50 | 1.99 | 4.33 | 7.00 |
| PROPERTIES | | | | | | | |
| Flex. Mod. $\times 10^{-3}$ | 96.9 | 137.2 | 148.9 | 167.9 | 96.0 | 137 | 147.2 |
| MFR | 2.8 | 4.4 | 1.1 | 4.1 | 3.0 | 4.1 | 4.4 |
| Tensile, Yield | 3193 | 4062 | 4601 | 4816 | 3019 | 3889 | 4129 |
| % Elong., Yield | 19.5 | 15.3 | 14.8 | 11.7 | 21 | 16 | 14 |
| Tensile, Fail | 1348 | 1302 | 458 | 750 | 2573 | — | — |
| % Elong., Fail | 546 | 194 | 159 | 117 | 607 | — | — |
| R.T. Notch, Izod | 15.4 | 6.5 | 7.4 | 0.9 | 14.1 | 1.7 | 1.4 |
| Unnotched Izod, | | | | | | | |
| at 0° F. | DNB | 43.2 | 16.3 | 16.8 | DNB | 22.6 | 15.8 |
| −20° F. | DNB | 36.2 | 13.8 | 15.7 | 42.5 | 18.3 | 12.6 |
| −40° F. | 48.5 | 26.3 | 14.4 | 14.1 | 29.1 | 12.7 | 10.5 |
| Gardner at 0° F. | >240 | 198 ± 6 | 9 ± 1 | 12 ± 1 | 207 | 82 ± 15 | 65 ± 7 |

TABLE I-continued

|  | Example 1 | Example 2 | Binary Blends | Conventional Blends A | B | C |
|---|---|---|---|---|---|---|
| (96 mil disks) | | | | | | |

[1]EHM 6003; Phillip's Chemical Co., HDPE MI = 0.3, density = 0.960 g/cc.
[2]E-612; Exxon Chemical Co. PP, MFR = 0.8.

TABLE II

| EXAMPLE NO. | 3 | 4 | 5 | 6 | 7 | 8 | 9 | 10 | 11 |
|---|---|---|---|---|---|---|---|---|---|
| EPR[3], wt.% | 10 | 10 | 10 | 10 | 10 | 2 | 4 | 6 | 8 |
| Polyethylene[4], wt.% | 0 | 10 | 20 | 30 | 40 | 37 | 37 | 37 | 37 |
| Polypropylene[5], wt.% | 90 | 80 | 70 | 60 | 50 | 61 | 59 | 57 | 55 |
| Ratio: PP/HDPE + EPR | — | 4.00 | 2.33 | 1.50 | 1.00 | 1.56 | 1.43 | 1.33 | 1.22 |
| PROPERTIES | | | | | | | | | |
| Flex. Mod. × 10$^{-3}$ | 173.0 | 161.0 | 151.0 | 144.0 | 126.0 | 174.0 | 161.0 | 152.0 | 140.0 |
| MFR | 4.2 | 3.5 | 2.6 | 2.2 | 1.7 | 1.9 | 2.0 | 2.0 | 1.9 |
| Tensile, Yield | 4373 | 4147 | 4043 | 3877 | 3770 | 4791 | 4571 | 4339 | 4063 |
| % Elong., Yield | 12.8 | 12.9 | 15.3 | 16.8 | 19.1 | 12.9 | 14.3 | 15.5 | 16.4 |
| Tensile, Fail | — | — | — | — | — | — | — | — | — |
| % Elong., Fail | — | — | — | — | — | — | — | — | — |
| R.T. Notch, Izod | 0.8 | 1.5 | 2.6 | 12.2 | 14.2 | 1.9 | 4.3 | 6.9 | 11.9 |
| Unnotched Izod, at 0° F. | — | — | — | — | — | — | — | — | — |
| −20° F. | 10.9 | 21.9 | 26.7 | 36.6 | DNB | 14.4 | 22.8 | 35.2 | 42.0 |
| −40° F. | — | — | — | — | — | — | — | — | — |
| Gardner at 0° F. | 72 ± 2 | 72 ± 27 | 124 ± 12 | 179 ± 6 | 221 ± 75 | 21 ± 2 | 54 ± 101 | 141 ± 8 | 176 ± 10 |
| (96 mil disks) | | | | | | | | | |

[3]VISTALON 404 (Exxon Chemical Company, U.S.A.) An ethylene-propylene copolymer rubber; Mooney viscosity = 40 (1+8' at 212° F.); 40 wt. % combined ethylene.
[4]EHM 6003; HDPE, MI = 0.3, density 0.960 g/cc.
[5]E-115, Exxon Chemical Company U.S.A. 5 MFR Homopolymer, Polypropylene.

TABLE III

| EXAMPLE NO. | 12 | 13 | 14 | 15 | 16 |
|---|---|---|---|---|---|
| EPR[3], wt.% | 10 | 10 | 10 | 10 | 10 |
| Polyethylene[4], wt.% | — | 10 | 20 | 30 | 40 |
| Polypropylene[6], wt.% | 90 | 80 | 70 | 60 | 50 |
| Ratio: PP/HDPE + EPR | — | 4.00 | 2.33 | 1.50 | 1.00 |
| PROPERTIES | | | | | |
| Flex. Mod. × 10$^{-3}$ | 140.0 | 133.0 | 125.0 | 115.0 | 106.0 |
| MFR | 2.7 | 1.0 | 1.0 | 0.79 | 0.75 |
| Tensile, Yield | 3904 | 3728 | 3687 | 3629 | 3470 |
| % Elong., Yield | 20.3 | 21.6 | 21.3 | 21.5 | 22.2 |
| Tensile, Fail | — | — | — | — | — |
| % Elong., Fail | — | — | — | — | — |
| R.T. Notch, Izod | 3.2 | 15.2 | 16.5 | 16.6 | 16.6 |
| Unnotched Izod, at 0° F. | — | — | — | — | — |
| −20° F. | 12.9 | 20.6 | 36.7 | DNB | DNB |
| −40° F. | — | — | — | — | — |
| Gardner at 0° F. | 43 ± 7 | 22 ± 4 | 151 ± 2 | 183 ± 21 | >240 |
| (96 mil disks) | | | | | |

[3]V-404
[4]EHM 6003
[6]E-612

TABLE IV

| EXAMPLE NO. | 15 | 16 | 17 | 18 | 19 | 20 | 21 | 22 | 23 |
|---|---|---|---|---|---|---|---|---|---|
| EPR[7], wt.% | 4.00 | 5.73 | 3.55 | 4.30 | 4.44 | 3.7 | 4.27 | 2.96 | 3.06 |
| Polyethylene[4], wt.% | 30.0 | 30.1 | 32.0 | 32.25 | 25.9 | 27.75 | 28.0 | 29.6 | 34.4 |
| Polypropylene[8], wt.% | 66.0 | 64.17 | 64.45 | 63.45 | 69.66 | 68.55 | 67.73 | 67.44 | 62.54 |
| Ratio: PP/HDPE + EPR | 1.94 | 1.79 | 1.87 | 1.74 | 2.30 | 2.18 | 2.10 | 2.07 | 1.67 |
| PROPERTIES | | | | | | | | | |
| Flex. Mod. × 10$^{-3}$ | 151 | 139 | 152 | 145 | 144 | 149 | 158 | 152 | 151 |
| MFR | 0.59 | 0.60 | 0.58 | 0.60 | 0.59 | 0.59 | 0.59 | 0.51 | 0.59 |
| Tensile, Yield | 4394 | 4226 | 4553 | 4400 | 4354 | 4421 | 4402 | 4617 | 4483 |
| % Elong., Yield | 18.4 | 18.6 | 17.9 | 18.9 | 18.7 | 18.7 | 18.4 | 18.2 | 17.7 |
| Tensile, Fail | — | — | — | — | — | — | — | — | — |
| % Elong., Fail | — | — | — | — | — | — | — | — | — |
| R.T. Notch, Izod | 14.8 | 15.8 | 12.6 | 15.8 | 15.0 | 14.9 | 14.7 | 12.9 | 14.0 |
| Unnotched Izod, at 0° F. | 53.4 | 58.9 | 54.5 | 51.1 | 47.2 | 49.3 | 50.9 | 37.5 | 42.2 |
| −20° F. | — | — | — | — | — | — | — | — | — |
| −40° F. | — | — | — | — | — | — | — | — | — |
| Gardner at 0° F. | 134 ± 20 | 144 ± 9 | 135 ± 9 | 100 ± 58 | 80 ± 11 | 88 ± 32 | 41 ± 27 | 91 ± 42 | 65 ± 7 |
| (96 mil disks) | | | | | | | | | |

[7]MD-714, An ethylene-propylene copolymer rubber; Mooney viscosity = 50 (1 + 8' at 212° F.); 50 wt.% combined ethylene
[8]FO.3, 0.35 MFR polypropylene.

TABLE V

| EXAMPLE No. | 24 | 25 | 26 | 27 | 28 | 29 |
|---|---|---|---|---|---|---|
| EPR[3], wt.% | 6.7 | 10.0 | 13.4 | 17.4 | 20.0 | 24.0 |
| Polyethylene[4], wt.% | 5.9 | 8.9 | 11.7 | 15.2 | 17.5 | 21.0 |
| Polypropylene[5], wt.% | 87.4 | 81.1 | 74.9 | 67.4 | 62.5 | 55.0 |
| Ratio: PP/HDPE + EPR | 6.94 | 4.29 | 2.98 | 2.07 | 1.67 | 1.22 |
| PROPERTIES | | | | | | |
| Flex. Mod. × $10^{-3}$ | 167 | 154 | 135 | 114 | 107 | 90 |
| MFR | 4.5 | 4.1 | 4.3 | 3.7 | 3.0 | 2.7 |
| Tensile, Yield | 4279 | 3928 | 3472 | 3096 | 2978 | 2604 |
| % Elong., Yield | 14.3 | 16.3 | 15.1 | 16.8 | 19.7 | 22.7 |
| Tensile, Fail | — | — | — | — | — | — |
| % Elong., Fail | — | — | — | — | — | — |
| R.T. Notch, Izod | 1.4 | 1.9 | 2.3 | DNB | DNB | DNB |
| Unnotched Izod, | | | | | | |
| at 0° F. | 18.9 | 30.9 | DNB | DNB | DNB | DNB |
| −20° F. | 14.4 | 20.4 | 32 | DNB | DNB | DNB |
| −40° F. | 12.4 | 16.7 | 28 | 43 | 47 | DNB |
| Gardner at 0° F. | 22 ± 6 | 95 ± 29 | 127 ± 8 | 230 ± 6 | >240 | >240 |
| (96 mil disks) | | | | | | |
| HDT at 66# (° C.) | — | — | 87 | 82 | 77 | 74 |

[3]V-404
[4]EHM 6003
[5]E-115

TABLE VI

| EXAMPLE NO. | 30 | 31 | 32 | 33 | 34 | 35 |
|---|---|---|---|---|---|---|
| EPR[3], wt.% | 9 | 6 | 3 | 18 | 12 | 6 |
| Polyethylene[4], wt.% | 3 | 6 | 9 | 6 | 12 | 18 |
| Polypropylene[5], wt.% | 88 | 88 | 88 | 76 | 76 | 76 |
| Ratio: PP/HDPE + EPR | 7.33 | 7.33 | 7.33 | 3.17 | 3.17 | 3.17 |
| PROPERTIES | | | | | | |
| Flex. Mod. × $10^{-3}$ | 181 | 195 | 207 | 137 | 153 | 178 |
| MFR | 4.7 | 4.4 | 4.5 | 3.9 | 3.7 | 3.6 |
| Tensile, Yield | 4377 | 4700 | 5004 | 3546 | 3909 | 4511 |
| % Elong., Yield | 12.9 | 12.4 | 13.1 | 14.2 | 14.7 | 14.2 |
| Tensile, Fail | — | — | — | — | — | — |
| % Elong., Fail | — | — | — | — | — | — |
| R.T. Notch, Izod | 0.9 | 0.9 | 0.9 | 1.8 | 1.7 | 1.4 |
| Unnotched Izod, | | | | | | |
| at 0° F. | 19.7 | 17.8 | 11.3 | 37.3 | 34.8 | 25.7 |
| −20° F. | 15.7 | 12.8 | 7.8 | 27.3 | 26.9 | 15.2 |
| −40° F. | 13.3 | 9.6 | 7.2 | 24.2 | 18.9 | 10.2 |
| Gardner at 0° F. | 80 ± 5 | 12 ± 4 | 1 ± 0.1 | 123 ± 6 | 114 ± 6 | 12 ± 2 |
| (96 mil disks) | | | | | | |

[3]V-404
[4]EHM 6003
[5]E-115

I claim:

1. A melt-flowable, high impact strength, melt mixed blend of polypropylene, ethylenepropylene copolymer rubber and polyethylene
   wherein the ratio by weight of the polypropylene component to the combined polyethylene and ethylenepropylene copolymer rubber components is from about 1.0 to about 2.0; and
   the polyethylene component is at least about 30% by weight of the total blend and the ethylene-propylene copolymer rubber component is from at least about 4% to about 11% by weight of the total blend.

2. The high impact blend of claim 1, wherein said ethylene-propylene copolymer rubber component is present from at least about 4% to about 8% by weight of the total blend.

3. The high impact blend of claim 1, wherein said polyethylene component has a density of at least about 0.950 g/cc.

4. The high impact blend of claim 3, wherein said polyethylene component has a melt index of from about 0.1 to about 20.

5. The high impact blend of claim 4, wherein when said polypropylene component has a melt flow rate greater than 1, the polyethylene component is at least about 37% by weight of the total blend and said ethylene-propylene copolymer rubber component is at least about 5.5% by weight of the total blend.

6. The high impact blend of claim 5, wherein said polyethylene component has a melt index of from about 1 to about 5.

7. The high impact blend of claim 1, wherein said ethylene-propylene copolymer rubber has a mooney viscosity greater than 20 and an ethylene content greater than 30% by weight.

8. The high impact blend of claim 7, wherein the ethylene content is between about 40 to about 60% by weight.

9. The high impact blend of claim 7, wherein said polypropylene component has a melt flow rate of from about 0.3 to about 12.0.

10. The high impact blend of claim 1, suitable for film applications, wherein said polyethylene component has a density of from about 0.910 to about 0.929 g/cc, and a melt index of from about 0.3 to about 20.

11. A pellet mixture for making melt mixed melt-flowable, high impact strength blends comprising:
   a pelletized blend, of a polypropylene component and an ethylene-propylene copolymer rubber component, produced by high shear mixing, and
   a pelletized polyethylene component; wherein said pelletized blend of polypropylene and ethylene-propylene is mixed with said pelletized polyethylene in proportions sufficient to produce a total pellet mixture wherein the ratio by weight of polypropylene to the total amount of polyethylene and ethylene-propylene copolymer rubber is from about 1.0 to about 2.0, the polyethylene is at least about 30% by weight of the pellet mixture, and the ethylene-propylene copolymer rubber is from at least about 4% to about 11% by weight of the pellet mixture.

12. A process for making a melt-flowable high impact melt mixed blend of polypropylene, ethylene-propylene copolymer rubber and polyethylene comprising the steps of:
   (a) high shear mixing of a polypropylene component with an ethylene-propylene copolymer rubber component; and
   (b) melt mixing the polypropylene and ethylenepropylene copolymer rubber of (a) with a polyethylene component to form a final blend of from about 4 to about 11% by weight ethylene-propylene rubber, at least about 30% by weight of polyethylene; wherein the ratio by weight of polypropylene to the combined ethylene-propylene rubber and polyethylene is from about 1 to about 2.

13. A process for making a melt-flowable high impact melt mixed blend of polypropylene, ethylene-propylene copolymer rubber and polyethylene comprising the steps of:
   (a) high shear mixing of a first portion of polypropylene with an ethylene-propylene copolymer rubber component; and
   (b) melt mixing the polypropylene and ethylenepropylene copolymer rubber of (a) with a second portion of polypropylene and a polyethylene component to form a final blend of from about 4 to about 11% by weight ethylene-propylene rubber, at least about 30% by weight polyethylene; wherein the ratio by weight of polypropylene to the combined amount of ethylene-propylene rubber and polyethylene is from about 1 to about 2.

14. The high impact blend of claim 1, wherein said polyethylene component has a density of at least about 0.919 g/cc.